United States Patent Office 3,177,239
Patented Apr. 6, 1965

3,177,239
PROCESS FOR OXIDIZING TRIVALENT P—NCO ESTERS AND ANHYDRIDES TO CORRESPONDING PENTAVALENT DERIVATIVES
Paul R. Steyermark, Silver Spring, Md., assignor to W. R. Grace & Co., a corporation of Connecticut
No Drawing. Filed Mar. 5, 1963, Ser. No. 263,076
4 Claims. (Cl. 260—461)

The present invention relates to the production of isocyanatophosphine oxides, and more specifically to a novel method by which isocyanatophosphines may be easily and economically oxidized to the corresponding isocyanatophosphine oxides.

It is generally known that the isocyanatophosphine oxides having the general formula $$R_nP(\!\!\stackrel{O}{\|}\!\!)(NCO)_{(3-n)}$$

where R represents hydrocarbon and hydrocarboxy radicals and $n$ has a value of from 0 to 2, find use as polymer intermediates and modifiers. Their ability to react with compounds having active hydrogen atoms, coupled with their combustion retardant characteristics, render them extremely useful in the formation of polyurethane and polyurea structures which possess both good physical properties and flame-resistance.

The use of isocyanatophosphine oxides would be much more widespread in polymer formation and modification but for the expense involved in their preparation. Classically, these compounds were prepared by reacting a pentavalent phosphonic chloride with silver isocyanate. Subsequently, methods were developed whereby trivalent isocyanatophosphines were oxidized by means of oxidizing agents such as ozone, nitrous oxide, and sulfur dioxide-trioxide mixture. However, the use of these reagents posses inherent drawbacks in that they involve the use of complex and expensive processing operations. To date a truly economical and efficient method for producing isocyanatophosphine oxides from the corresponding phosphines has not been developed.

It is, therefore, an object of the present invention to provide an improved method for preparing isocyanatophosphine oxides from the corresponding isocyanatophosphines.

It is another object to provide a method by which isocyanatophosphines may be oxidized to the corresponding oxides by means of inexpensive reagents and simple techniques.

These and still further objects of the present invention will become readily apparent to one skilled in the art from the following detailed description as specific examples.

Broadly, my invention involves a method for oxidizing isocyanatophosphines to the corresponding isocyanatophosphine oxides which comprises contacting an isocyanatophosphine with sulfuryl chloride, and subsequently recovering the isocyanatophosphine oxide which is formed. The reaction is believed to take place according to the following equation:

$$R_nP(NCO)_{n-3} + SO_2Cl_2 \longrightarrow R_n\!\!\stackrel{O}{\|}\!\!P(NCO)_{n-3} + SOCl_2$$

More specifically, I have found that if isocyanatophosphine is admixed with sulfuryl chloride at a temperature of from about −80° C. to about 100° C. a spontaneous reaction occurs wherein the corresponding isocyanatophosphine oxide is formed in good yield. Thionyl chloride, which is formed as a by-product of the reaction, may be easily removed by vacuum distillation and recovered for further use.

The desired isocyanatophosphine oxide which is recovered from the reaction mixture may be purified using a conventional work-up procedure. The reaction may be carried out without a solvent. On the other hand, if desired, an inert reaction solvent (one which does not possess active hydrogen atoms) may be used. Stoichiometric amounts of isocyanatophosphine and sulfuryl chloride may be used or an excess of sulfuryl chloride may be used.

In view of the fact the reaction is strongly exothermic, it is generally preferred that the isocyanatophosphine be added slowly to the sulfuryl chloride or a solution thereof to permit a smooth, controlled reaction. Alternatively, the reactants may be admixed at a temperature below the spontaneous reaction temperature thereof and subsequently warmed to a temperature at which the reaction will proceed at a reasonable rate. Generally, the reaction temperatures used will range from about −10° C. to about 50° C. At temperatures above about 100° C. undue degradation of the reactants and/or products may occur.

Using the general temperature ranges specified above, it is found that the reaction will proceed almost simultaneously with the combination of the reactants.

Subsequent to completion of the reaction, excess sulfuryl chloride, along with thionyl chloride, which is produced during the course of the reaction, may be removed by evaporation either at normal pressure or under vacuum. Furthermore, if a reaction solvent has been used, vacuum distillation may be an effective way for removing it from the product. The product, after removal of volatile components, may be further purified by distillation.

As indicated above, isocyanatophosphine which may be utilized in the present invention possess the general formula $$R_nP(NCO)_{n-3}$$

wherein R is a hydrocarbon or hydrocarboxy radical which may or may not contain inert substituents such as halo, nitro, alkoxy, carbalkoxy, and so forth, and $n$ represents an integer having a value of 0 or 2.

Typical examples of R are hydrocarbon radicals such as alkyl which includes methyl, ethyl, isopropyl, amyl, decyl or octadecyl; aryl, such as phenyl, xylyl, diphenyl, napthyl, arylalkyl, such as benzyl and phenylethyl; and cycloalkyl, such as cyclopentenyl, methylcyclopentenyl, ethylcyclohexyl, and dimethylcyclohexyl. In the event R is a hydrocarboxy radical, suitable radicals may be methoxy, ethoxy, isopropoxy, phenoxy, benzyloxy, phenylethoxy and cyclohexyloxy. Furthermore, halo and nitro-substituted hydrocarbon radicals which may be used are fluoromethyl, fluoroethyl, bromoethyl, flurroethyl, chlorophenyl, chlorobenzyl, chloromethylcyclohexyl, chlorocyclohexyl, nitroethyl, nitrophenyl or nitrocyclohexyl.

Having described the basic elements of the present invention, the following specific example is given to illustrate the embodiments thereof.

Example I

A 20-gram sample of sulfuryl chloride was added dropwise with stirring to 18.8 grams phenyl phosphorodiisocyanatidite, $C_6H_5OP(NCO)_2$, maintained at room temperature. The reaction was exothermic and the mixture assumed a dark coloration. The mixture was maintained for one hour at room temperature and the volatile constituents were removed by slight heating at reduced pressure. The residue which was a dark color, was fractionated on a spinning band column. The product weighed 14.64 grams and represented a 70% yield of phenyl phosphorodiisocyanatidate having the following formula:

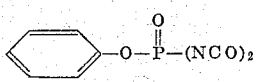

The index of refraction of the above compound was $n_D^{20}=1.5201$.

On treatment with anhydrous methyl alcohol, the phenyl phosphorodiisocyanatidate gave a 76% yield of the corresponding bis-methyl carbamate, M.P. 147–149°.

*Analysis.*—Calculated for $C_{10}H_{13}N_2O_6P$: C, 41.67; H, 4.55; N, 9.72; P, 10.75. Found: C, 41.96; H, 4.95; N, 9.79; P, 10.67.

*Example II*

Oxidation of 12 g. (0.0463 mole) of diphenyl phosphorisocyanatidite, $(C_6H_5O)_2PNCO$, with 9.4 g. (0.0606 mole) of sulfuryl chloride gave a 75% yield of diphenyl phosphorisocyanatidate, $(C_6H_5O)_2P(O)NCO$, B.P. 142–144° at 0.2 mm.; refraction index $n_D^{20}=1.5473$. Reported [A. V. Kirsanov and I. N. Zhumrova, Chem. Abstr. 52, 3715h (1958)]: B.P. 184–186° at 5 mm.; $n_D^{20}=1.5470$. Hydrolysis of the material gave diphenyl phosphoramidate M.P. 147–148° (reported by Kirsanov et al., op. cit. M.P. 148–150°).

*Example III*

To a solution of 20 g. (0.0965 mole) of phenyl phosphorodiisocyanatidite in 55 g. of dry carbon tetrachloride there was added dropwise 20 g. (0.147 mole) of sulfuryl chloride while stirring vigorously. The solution initially warmed nearly to boiling. It was stirred for ninety minutes, gradually cooling to room temperature. After the volatile liquids had been removed at a slightly reduced pressure, the liquid residue was distilled in a vacuum. A 62% yield of phenyl phosphorodiisocyanatidate was obtained.

*Example IV*

To a solution of 8.1 g. (0.39 mole) of phenyl phosphorodiisocyanatidite in 50 g. of carbon tetrachloride there was added dropwise 6.1 g. (0.045 mole) of sulfuryl chloride at −5 to −10° C. with good stirring. After the addition had been completed, the cooling bath was removed, and the solution was stirred for ten minutes. The solution was concentrated at a reduced pressure, and the residue was distilled through a spinning band column. A 70% yield of phenyl phosphorodiisocyanatidite, B.P. 110° at 10.2 mm., was obtained. The refraction index was $n_D^{20}=1.5227$ and melting point 28° C.

*Analysis.*—Calculated for $C_8H_5N_2O_4P$: C, 42.87; H, 2.25; N, 12.50; P, 13.82. Found: C, 42.41; H, 2.32; N, 12.21; P, 12.6.

On treatment with methanol, the diisocyanate gave the previously reported bis-methyl carbamate.

The above specific examples clearly indicate that isocyanatophosphines may be quickly and conveniently oxidized to the corresponding oxides, using the process set forth herein.

I claim:

1. A process for preparing a compound of the formula

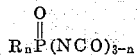

wherein R is selected from the group consisting of phenyl and phenoxy radicals, and $n$ is an integer of from 0 to 2, which comprises reacting a compound of the formula

wherein R and $n$ have the meanings set forth above, with sulfuryl chloride at a temperature of from about −80° C. to about 100° C.

2. The process of claim 1 wherein said reaction is conducted in the presence of an inert solvent.

3. The process of claim 1 wherein the isocyanatophosphine is phenyl phosphorodiisocyanatidite.

4. The process of claim 1 wherein the isocyanatophosphine is diphenyl phosphorisocyanatidite.

References Cited by the Examiner

FOREIGN PATENTS 594,993   3/61   Belgium.

OTHER REFERENCES

Atherton et al.: "Chem. Abst.," vol. 44, col. 7793–7794 (1950).

Poshkus et al.: "J. Am. Chemical Soc.," vol. 80, pp. 5022–5028 (1958).

CHARLES B. PARKER, *Primary Examiner.*